United States Patent [19]

Cole

[11] 4,175,164
[45] Nov. 20, 1979

[54] THERMOELECTRIC GENERATOR ELECTRODE

[75] Inventor: Terry Cole, Dearborn, Mich.

[73] Assignee: Ford Motor Company, Dearborn, Mich.

[21] Appl. No.: 894,969

[22] Filed: Apr. 10, 1978

[51] Int. Cl.² .................................................. H01M 10/36
[52] U.S. Cl. ........................................ 429/11; 429/193; 427/444
[58] Field of Search ............... 429/193, 191, 164, 30, 429/120, 26, 126, 209, 17, 20, 11, 112; 427/444, 252, 255; 136/200, 201, 205

[56] References Cited

U.S. PATENT DOCUMENTS

| | | | |
|---|---|---|---|
| 3,138,488 | 6/1964 | Tragert | 429/26 |
| 3,402,078 | 9/1968 | Spacil | 429/193 X |
| 3,458,356 | 7/1969 | Kummer et al. | 429/104 |
| 3,511,715 | 5/1970 | Angus | 429/17 |
| 3,843,400 | 10/1974 | Radford et al. | 429/193 X |
| 4,042,757 | 8/1977 | Jones | 429/20 X |
| 4,048,391 | 9/1977 | Tilley et al. | 429/104 |
| 4,049,877 | 9/1977 | Saillant et al. | 429/11 |
| 4,076,903 | 2/1978 | Sudworth et al. | 429/104 |

OTHER PUBLICATIONS

Weber, A Thermoelectric Device Based on Solid Electrolyte, Energy Conversion, vol. 14, pp. 1-8, 1974.

Primary Examiner—Anthony Skapars
Attorney, Agent, or Firm—Edmund C. Ross, Jr.; Olin B. Johnson

[57] ABSTRACT

A new class of porous electrodes deposited on solid electrolyte for use in thermoelectric generator devices as the sodium heat engine. The electrode configuration has an openness that provides especially high electrode efficiency.

19 Claims, 7 Drawing Figures

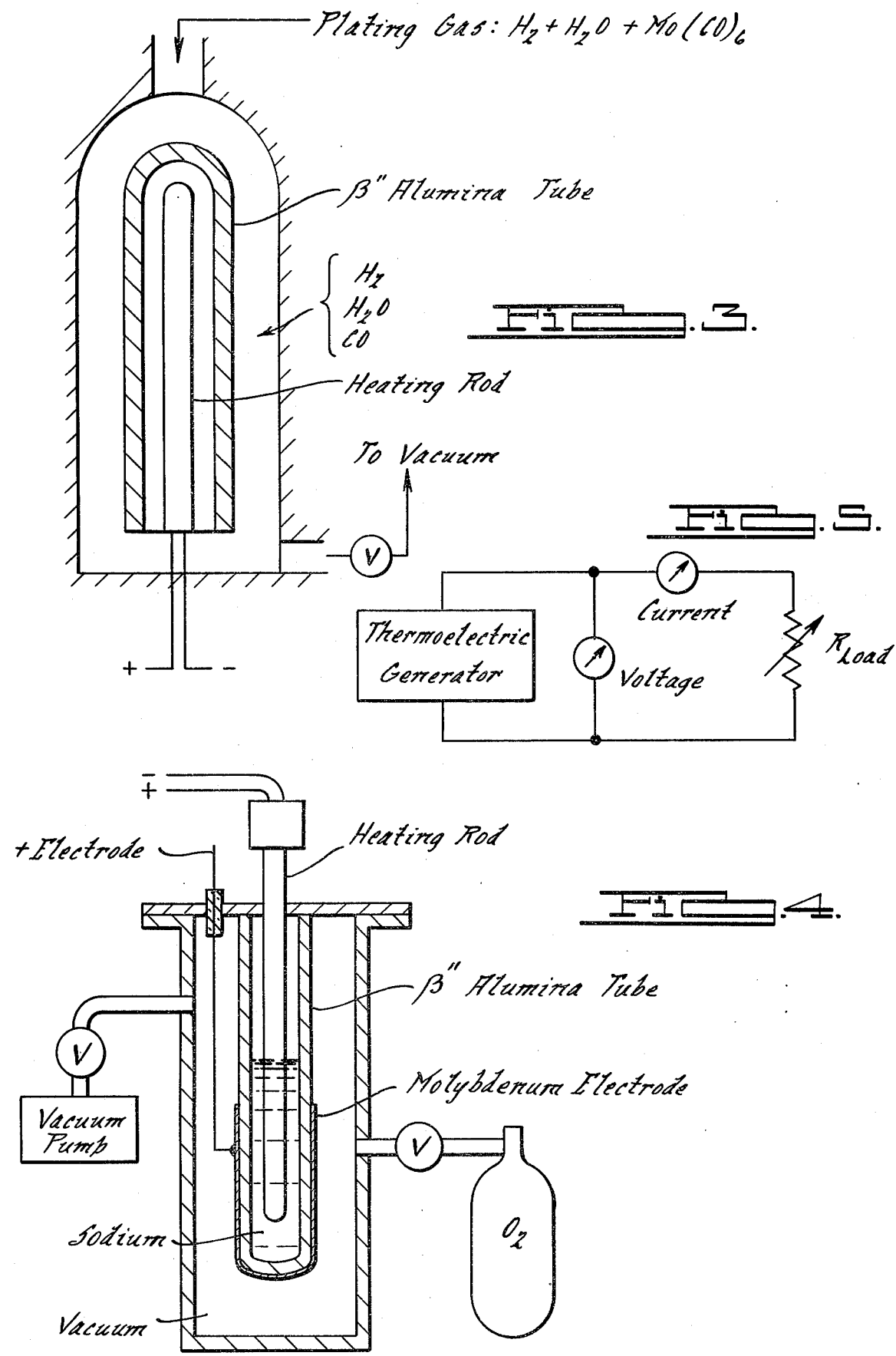

THERMOELECTRIC GENERATOR ELECTRODE

BACKGROUND OF THE INVENTION

This invention relates to thermoelectric generators using a working substance as alkali metal and includes, in particular, a new class of porous electrodes on solid electrolyte for such devices that have high efficiency and, consequently, car lead to high power output.

Thermoelectric generator devices using alkali metals, e.g. sodium, as the working fluid have been previously described (see, for example, U.S. Pat. Nos. 3,458,356; 3,511,715; 4,042,757; 4,049,877 and U.S. Ser. No. 813,711, filed 7/7/77, now U.S. Pat. No. 4,098,958 which are hereby incorporated by reference for such disclosure) so there is not a need for further description. Moreover, U.S. Pat. No. 4,049,877 also describes a chemical vapor deposition technique that allows preparation of advantageous porous electrodes on solid electrolyte. The porous electrode of this invention can provide higher power outputs as compared to certain of those which are now typically made by chemical vapor deposition and comprise an ordered orientation of metal as molybdenum.

BRIEF DESCRIPTION OF THE DRAWINGS

FIG. 3 is a schematic of a process (chemical vapor deposition) that may be used to provide a porous electrode on ceramic tube before treatment in accordance with this invention.

FIG. 4 is a schematic illustrating a thermoelectric generator assembly in which deposited electrodes may be improved in accordance with this invention.

FIG. 5 is a schematic illustrating apparatus used to make measurements of current and voltage illustrated in FIGS. 6 and 7.

THE INVENTION

Figure 1:
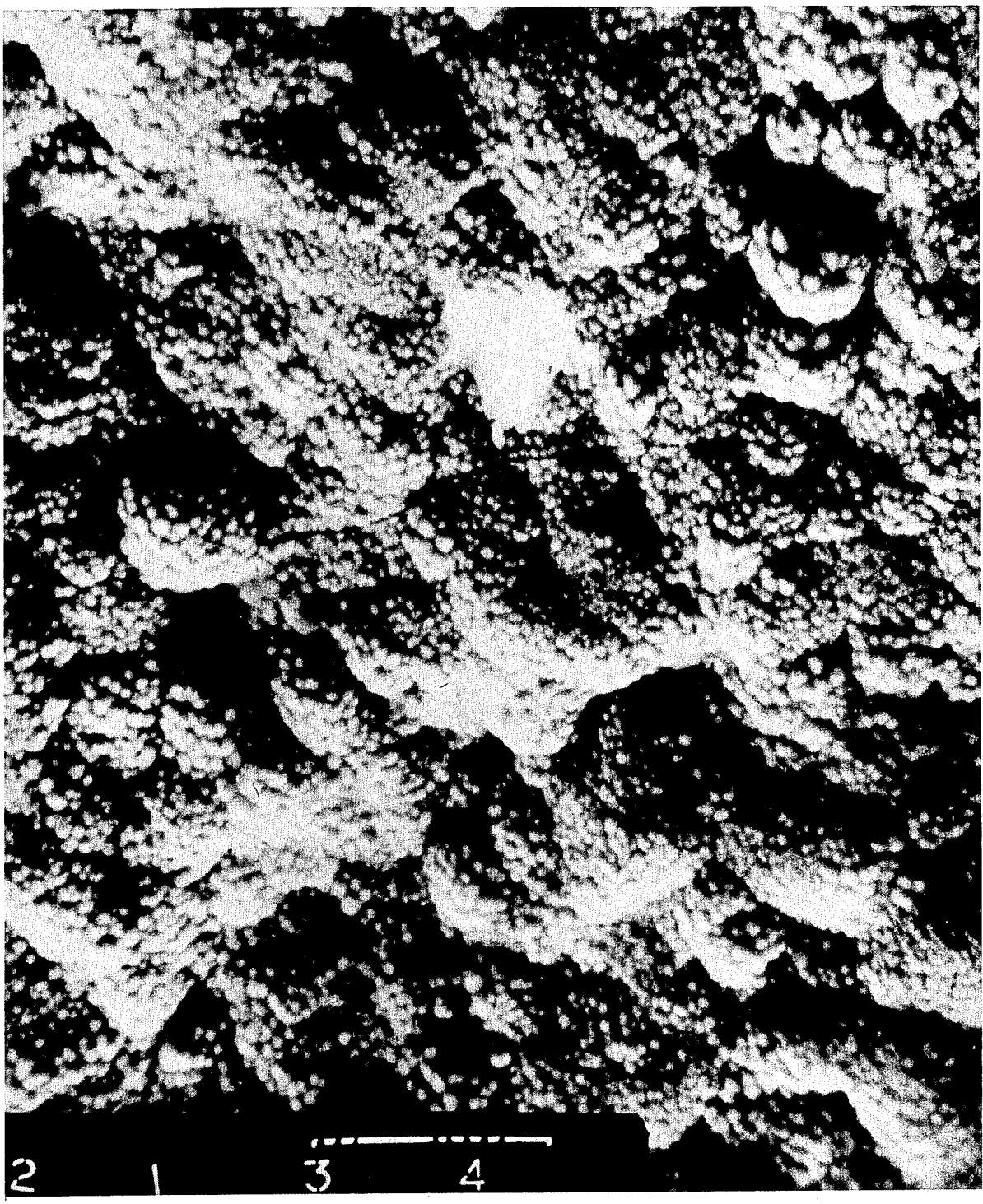
FIG. 1 is a photomicrograph (1000×) of a porous electrode made according to a chemical vapor deposition technique.
Figure 2:
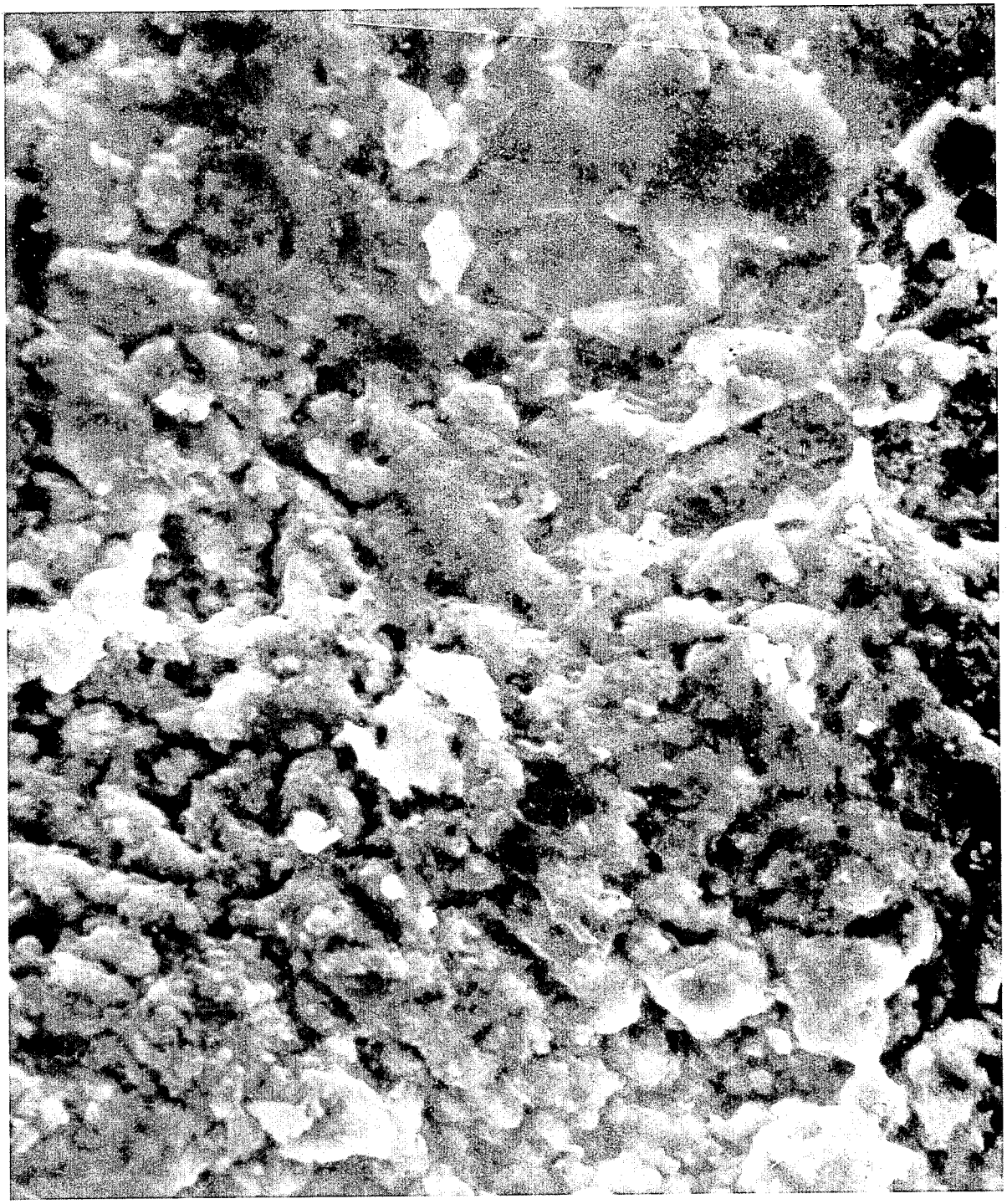
FIG. 2 is a photomicrograph (1000×) of a porous electrode of this invention.

This invention relates to a new class of porous electrodes for alkali metal thermoelectric generators. As distinguished from electrodes that are deposited on solid electrolyte by techniques as chemical vapor deposition and which typically have largely a tight columnar substructure, (see FIG. 1), the electrodes of this invention have a configuration of more openness or porosity. In one embodiment, this openness or porosity is achieved by an electrode configuration that has a greater level of equiaxed grains on its surface.

While porosity has been known as a feature desirable for electrodes deposited on solid electrolyte for thermoelectric generators, a relationship between pore size, density and the like of the electrically continuous electrodes and efficiency had not been established. Now, in accordance with this invention, more efficient electrodes are readily provided that give exceptional power densities.

The electrodes of this invention may be made in a number of different ways. In a redeposition route, the electrodes are made in a thermoelectric generator device assembly. In this route, a previously vapor deposited porous electrode as of molybdenum is exposed to oxidizing conditions followed by reducing condition as, for example, by operation of the device to effect a redeposition of the deposited electrode and formation of the electrode of this invention. In another such route, a conductor on solid electrolyte is exposed to oxidizing conditions ina chemical deposition process and stored at ambient temperatures until it is readied for use by exposure to reducing conditions.

DETAILED DESCRIPTION OF THE INVENTION

This invention comprises in one aspect a new class of electrodes on solid electrolyte, particularly ceramic as beta alumina, that permit high power densities in alkali metal thermoelectric generators.

The novel electrode of this invention may be made by exposing an electrode, previously deposited onto solid electrolyte by usual techniques as by vapor deposition, to oxidizing conditions followed by reducing conditions. These conditions effect an oxidation, reduction and consequent redeposition in the already deposited electrode and modify the surface configuration from a mostly columnar orientation to a less ordered orientation as nodular that has platy, grannular texture. The greater level of equiaxial grains allows higher levels of alkali metal escape and yet advantageously maintains capability for a continuous dispersion of electrons throughout the electrode. Deposition procedures to achieve these electrodes are not a critical feature providing adequate openness or porosity is obtained.

In a preferred embodiment, a metal conductor as molybdenum is deposited on solid electrolyte as a beta alumina by chemical vapor deposition to achieve an optimum thickness in accordance with such deposition technique. The thickness of porous conductor deposited is desirably an average between about 1–20 micrometers (e.g. preferably between about 1–15 micrometers of molybdenum peaks) and achieved by processes like those described by U.S. Pat. No. 4,049,877 which is incorporated by reference for its disclosure.

In this preferred embodiment wherein the metal conductor is first deposited by a vapor deposition, the electrode then undergoes redeposition to achieve characteristics suitable for this invention. The redeposition is preferably initiated by oxidation which may be accomplished by exposure to oxygen at high temperature, e.g., above about 500° C.

In one route, the oxidation begins by admission of oxygen into the evacuated low pressure side of an assembled thermoelectric device with the working substance as liquid sodium in contact with the solid electrolyte on the opposite side of a previously deposited electrode. Admission of only low pressures of oxygen are necessary in this embodiment, e.g. below about 10 torr, although, of course, the degree of oxidation may be varied in accordance with factors as length and amount of exposure. Desirable results have been achieved wherein the oxygen of the electrode is not complete, but, rather, mostly a surface and partly below oxidation is seen. In this embodiment, the electrode can be used immediately by simply beginning operation of the assembled device by permitting electron flow through an external circuit.

After completion of oxidation, the electrode may be allowed, alternatively, to cool and be stored at room temperature for later reduction as described hereafter. A reduction may also be accomplished in the assembled thermoelectric generator by, for example, simply operating the device. Reduction in this manner is believed accomplished by reaction of the oxidized electrode (e.g. $MoO_2$) with elemental alkali metal as sodium which then at high temperature vaporizes as an oxide during such operation of the device. After a brief induction period with the oxidized electrode, the device then begins to exhibit the higher power densities in accordance with this invention.

Conductors suitable as electrodes for this invention should meet several criteria. Importantly, such criteria include:

1. a melting point and sintering temperature above the temperatures at which the device is to be operated;
2. good electrical conductivity at the temperatures at which the device is to be operated;
3. a coefficient of expansion similar to that of the solid electrolyte;
4. inertness to the working fluid as alkali metal at operating conditions;
5. adherence to the solid electrolyte over a large temperature range, e.g. up to 1000° C. or more;
6. low electrical contact resistance with the solid electrolyte.

Molybdenum has been found to exhibit the above and is therefore preferred, although other conductors comprising especially tungsten, as well as chromium, nickel and iron and mixtures thereof that met such criteria should also be selected and lead to improved electrodes.

The electrodes of this invention will comprise average metal peaks below about 50 micrometers and valleys below about 10 micrometers as measured in a direction perpendicular to the surface of greatest electrode and electrolyte contact and desirable electrodes are seen with peaks below about 25 micrometers and valleys below about 5 micrometers. Design criteria of the alkali metal thermoelectric generator may to an extent affect some portions of electrode thickness and porosity, however, as it may be desirable to adjust thickness of portions of the electrode, for example, in accordance with electron density arriving from the external circuit.

Measurement of voids in the surface of electrodes of this invention in micrographs show that pore diameters or voids contributing to porosity are much greater in size than those typical of chemical vapor deposition, namely, diameters above on the average 0.15 microns and typically above 0.5 microns as in a range between 0.6–1.2 microns with some even larger. As noted earlier, it is such porosity that is now seen to relate to electrode efficiency and consequent power density by facilitating escape of alkali metal through the pore volume of the electrode.

The solid electrolyte desirably employed in the devices of this invention may be selected from a wide range of glass or polycrystalline ceramic material. Among the glasses which may be used with such devices and which demonstrate an unusually high resistance to attack by alkali metal are those having the following composition: (1) between about 47 and about 58 mole percent sodium oxide, about 0 to about 15, preferably about 3 to about 12, mole percent of aluminum oxide and about 34 to about 50 mole percent of silicon dioxide; and (2) about 35 to about 65 preferably, about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700° F.

The polycrystalline ceramic materials desirable as solid electrolytes are bi- or multi-metal oxide. Among the polycrystalline bi-or multi-metal oxides most useful in the devices of this invention are those within the family of Beta-alumina all of which exhibit a generic crystalline structure which is readily identifiable by X-ray diffraction. Thus, Beta-type-alumina or sodium Beta-type-alumina is a material which may be thought of as a series of layers of aluminum oxide held apart by columns of linear Al—O bond chains with sodium ions occupying sites between the aforementioned layers and columns. Among the numerous polycrystalline Beta-type-alumina materials suitable as solid electrolytes are the following:

1. Standard Beta-type-alumina which exhibits the above-discussed crystalline structure comprising a series of layers of aluminum oxide held apart by layers of linear Al—O bond chains with sodium occupying sites between the aforementioned layers and columns. Beta-type-alumina is formed from compositions comprising at least about 80% by weight, preferably at least about 85% by weight, of aluminum oxide and between about 5 and about 15 weight percent, preferably between about 8 and about 11 weight percent, of sodium oxide. There are two well-known crystalline forms of Beta-type-alumina, both of which demonstrate the generic Beta-type-alumina crystalline structure discussed hereinbefore and both of which can easily be identified by their own characteristic X-ray diffraction pattern. Beta-alumina is one crystalline form which may be represented by the formula $Na_2O.11Al_2O_3$. The second crystalline form is $\beta''$-alumina which may be represented by the formula $Na_2O.6Al_2O_3$. It will be noted that the $\beta''$ crystalline form of Beta-type-alumina contains approximately twice as much soda (sodium oxide) per unit weight of material as does the Beta-alumina. It is the $\beta''$-alumina crystalline structure which is preferred for the formation of solid electrolyte for devices of this invention.

2. Boron oxide $B_2O_3$ modified Beta-type-alumina wherein about 0.1 to about 1 weight percent of boron oxide is added to the composition.

3. Substituted Beta-type-alumina wherein the sodium ions of the composition are replaced in part or in whole with other positive ions which are preferably metal ions.

4. Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as the result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent.

The solid electrolyte is shaped so as to conform with design considerations of the device, see, for example, U.S. Pat. No. 4,049,877 and desirably as a reaction zone separator is of minimal thickness, as low as 0.1 cm or less. With the advent of beta alumina or other ceramic of high structural integrity at thickness as low as 100 microns, particularly efficient devices may be constructed for it has been discovered that reducing the thicknesses improves overall efficiency by reduction of bulk resistance without otherwise loss in efficiency.

The following examples illustrate preferred aspects of this invention and are not as limiting to the scope of this invention as those in the art will appreciate that many modifications can be made that will achieve the improved electrodes on solid electrolyte of this invention.

EXAMPLE 1

Using a chemical vapor deposition technique similar to that described in the Example of U.S. Pat. No. 4,049,877, a molybdenum electrode is chemically vapor deposited on a lithia stabilized $\beta''$-alumina tube at 700° C. A device as is illustrated in the schematic of FIG. 3 is used to chemically vapor deposit the molybdenum. The deposited electrode has a columnar configuration as illustrated by the micrograph of FIG. 1.

The procedures of the above chemical vapor deposition are as follows. The alumina tube in FIG. 3 has a temperature of 700° C. achieved by heating it in a stream of $Mo(CO)_6$, hydrogen gas and water vapor. The $Mo(CO)_6$ decomposes on the hot tube substrate to form a coating of molybdenum metal. The plating continues for 1 hour at the 700° C. The pressures conditions during the plating are typically: hydrogen-21 microns; water vapor-7 microns; carbon monoxide 20 microns.

The current voltage characteristics of a sodium thermoelectric generator comprising the electrode on solid electrolyte as described above is measured in accordance with the network of FIG. 5. The characteristics at 800° C. are plotted in the curve labeled "Before" in FIG. 4. In measuring the characteristics with the apparatus of FIG. 5, load resistance of variable magnitude is placed across the output terminals of the sodium thermoelectric generator device. At each temperature of interest the load resistor is adjusted over a range of values and current and voltage simultaneously monitored and recorded.

Figure 6:
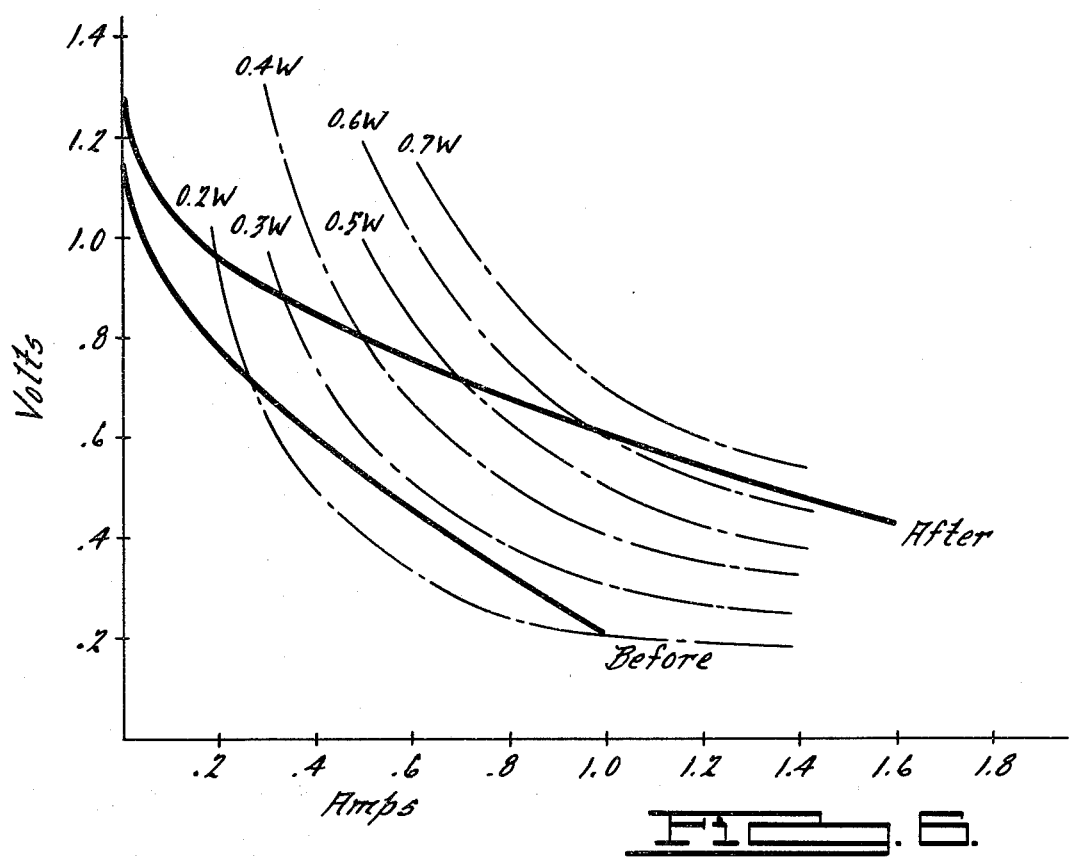
FIG. 6 is a current voltage plot from an operating alkali metal thermoelectric generator device employing (1) a standard electrode made by chemical vapor deposition ("Before") and (2) after its treatment in accordance with this invention ("After").

The electrode on electrolyte as above described for which current voltage characteristics have been obtained is then processed in accordance with this invention. First, the tube is allowed to cool within the thermoelectric generator device (illustrated in FIG. 4) to room temperature and then heated to between 500°-700° C. while 1.2 torr oxygen is admitted for 20 minutes into the evacuated chamber surrounding the tube having electrode deposited thereon. Vacuum is then reestablished and the device allowed to cool. Upon heating the device again to operating conditions, an induction period of a few minutes begins until a desirable power output occurs. The curve shown in FIG. 6 labeled "After" illustrates the results of voltage-current study at 800° C. using the network of FIG. 5 in the same thermoelectric generator device as above. As can be seen, a considerable increase in power density is seen as compared to the chemically deposited electrode.

EXAMPLE 2

The procedure of EXAMPLE 1 is repeated except the oxidizing conditions are provided after chemical vapor deposition in the device shown in FIG. 1 by heating the tube having already deposited electrode to 700° C. in a vacuum and allowing oxygen in at 1.0 torr for 10 minutes.

Figure 7:
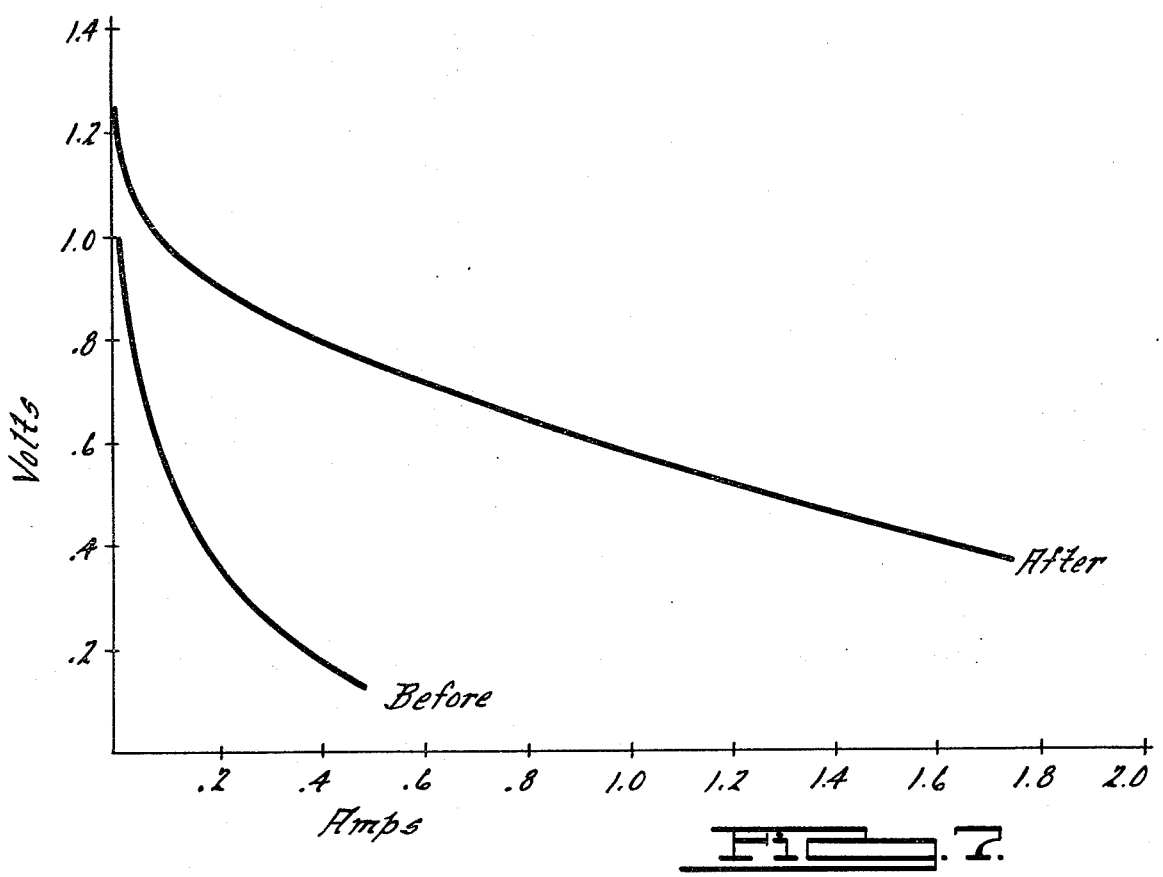
FIG. 7 is another plot of current voltage characteristics of an electrode of this invention made in accordance with Example 2.

The oxidized electrode is then cooled and assembled into a thermoelectric generator whereupon operation at 700° C., after an induction period of a few minutes, again shows improvement in power density as compared to that obtained by chemical vapor deposition. Using the network of FIG. 5, the current voltage characteristics are obtained and shown in FIG. 7.

EXAMPLE 3

The procedure of Example 1 is followed except after admission of oxygen at high temperature and subsequent reestablishment of vacuum, the device is allowed to cool and stands seven days at room temperature before operation. Upon operation of the device and a short induction period desirable output powers are obtained, e.g. greater than 0.3 w/cm² at 700° C.

What is claimed is:

1. An alkali metal thermoelectric generator device that has an electrically continuous, porous electrode on solid electrolyte that comprises metal peaks averaging below about 50 micrometers and valleys below about 10 micrometers and having an average pore diameter above about 0.15 microns.

2. The device in accordance with claim 1, wherein the electrode comprises equiaxed grains on its surface.

3. The device in accordance with claim 1 or 2 wherein the electrolyte comprises a beta alumina.

4. The device in accordance with claim 3, wherein the electrolyte comprises $\beta''$ alumina.

5. The device in accordance with claims 1 or 2 wherein the metal comprises metal molybdenum.

6. An improved alkali metal thermoelectric generator device that has an electrode on a solid electrolyte made by a process comprising exposing a metal conductor deposited on the electrolyte to oxidizing conditions.

7. The device in accordance with claim 6 wherein the process comprises exposing the oxidized conductor to reducing conditions.

8. The device in accordance with claims 6 or 7 wherein the deposited metal conductor is deposited by chemical vapor deposition.

9. The device in accordance with claim 8, wherein the metal conductor comprises molybdenum.

10. The device in accordance with claims 6 or 7, wherein the metal conductor comprises molybdenum.

11. A process that improves performance of porous electrode on solid electrolyte in an alkali metal thermoelectric generator device which comprises:
    (A) exposing a metal conductor deposited on the electrolyte to oxidizing conditions;
    (B) exposing the oxidized conductor of (A) to reducing conditions.

12. The process in accordance with claim 11 which comprises exposing the oxidized conductor to reducing conditions comprising metallic sodium at high temperature.

13. The process in accordance with claims 11 or 12, wherein the exposure to oxidizing conditions comprises contacting the conductor with oxygen.

14. The process in accordance with claim 13, wherein the conductor comprises molybdenum.

15. The process in accordance with claim 11, wherein the conductor comprises molybdenum.

16. In an alkali metal thermoelectric generator device which comprises electrode of porous metal deposited on solid electrolyte, the improvement which comprises an electrode on the solid electrolyte that has been exposed to oxidizing conditions.

17. The alkali metal thermoelectric generator in accordance with claim 16, wherein the oxidizing is conducted within the thermoelectric generator.

18. The alkali metal thermoelectric generator in accordance with claims 16 or 17 wherein a reducing is conducted at conditions comprising a temperature range above about 500° C.

19. The alkali metal thermoelectric generator in accordance with claims 16 or 17 wherein the electrode comprises molybdenum.

* * * * *